March 5, 1935.  F. H. KELLEY  1,993,608
COPING SAW
Filed Aug. 29, 1934
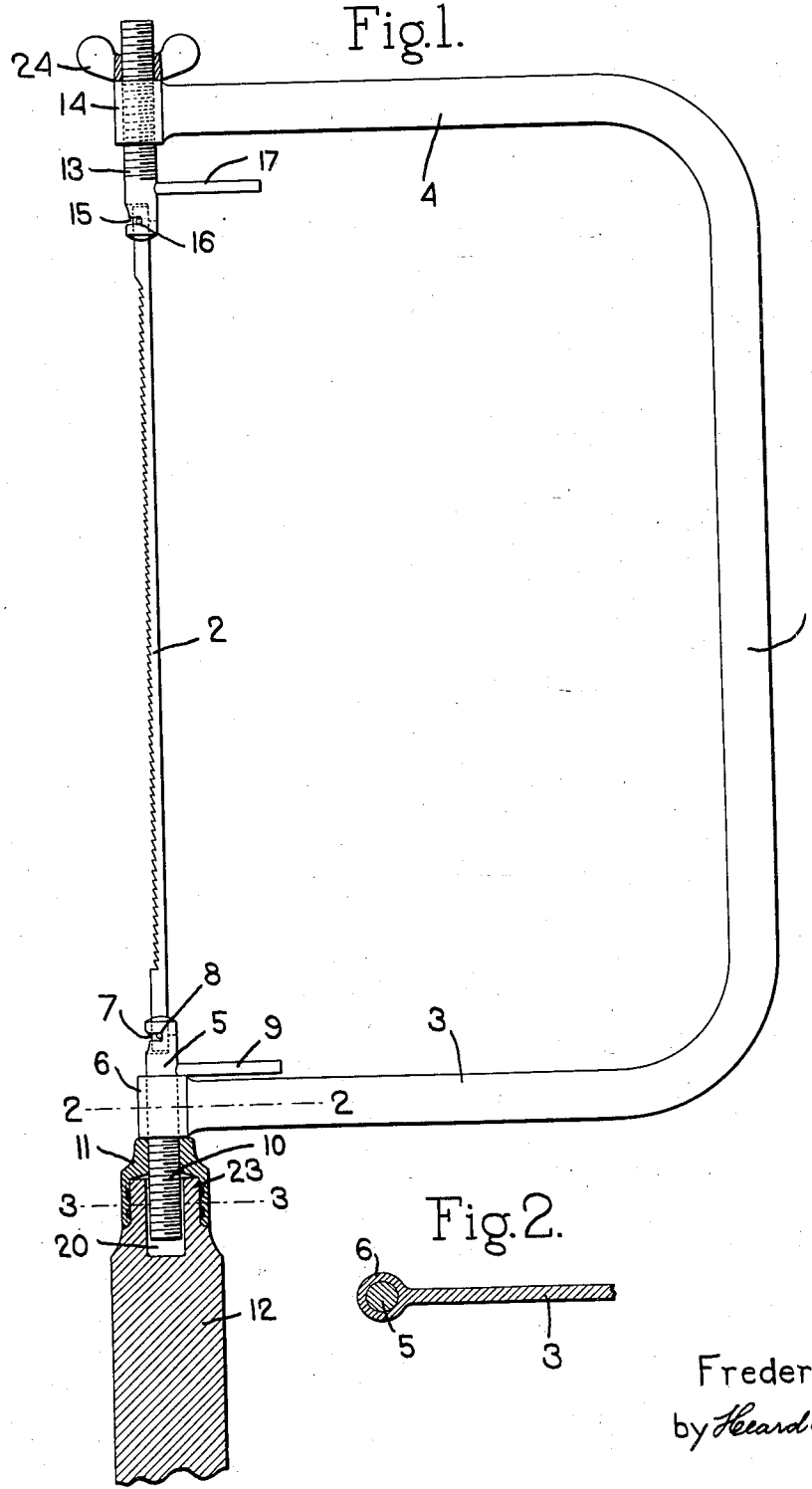
Inventor.
Frederick H. Kelley
by Heard Smith & Tennant.
Attys.

Patented Mar. 5, 1935

1,993,608

UNITED STATES PATENT OFFICE 1,993,608

COPING SAW

Frederick H. Kelley, Franklin, N. H., assignor to G. W. Griffin Co., Franklin, N. H., a corporation of New Hampshire Application August 29, 1934, Serial No. 741,954

1 Claim. (Cl. 145—33)

This invention relates to coping saws and it has for its object to provide certain novel features which will be more fully hereinafter described and then set forth in the appended claim.

In the drawing:

Fig. 1 is a view, partly in section, of a saw embodying my invention.

Fig. 2 is a section on the line 2—2, Fig. 1.

Fig. 3 is a section on the line 3—3, Fig. 1.

Fig. 4 is a sectional view of the ferrule used on the handle.

The saw herein illustrated is of the type having the C-shaped frame member 1 and the saw blade 2 extending between and connected to the ends of the arms 3 and 4 of the frame 1.

At the handle end of the frame, the saw blade 2 is detachably connected to a saw-supporting member 5 which extends through and is slidable and turnable in the boss 6 formed on the end of the frame arm 3. This saw-supporting member 5 is provided with the usual slot at its end to receive the end of the saw blade 2 and it is also provided with the usual notch 7 to receive either the pin 8 or its equivalent with which the saw blade is provided. The member 5 is shown as having the lateral projection 9 by which it may be turned in boss 6. The member 5 extends through the boss 6 and below the latter and the lower end of said member is screw-threaded as shown at 10 and is adapted to have screw-threaded engagement with a ferrule 11 carried by the handle 12 of the saw, this being a more or less common construction in saws of this type.

The connection between the upper end of the saw blade 2 and the frame arm 4 is through the medium of a screw-threaded member 13 which is screw-threaded through the boss 14 formed on the end of the arm 4. This member 13 is also provided with the usual slot to receive the end of the saw blade 2 and with the notch 15 to receive the pin 16 or its equivalent with which the upper end of the saw blade is provided.

The member 13 is also provided with a laterally extending projection or finger piece 17 by which it may be turned.

The object of employing the screw-threaded connection between the saw-supporting member 13 and the frame arm 4 is two-fold. In the first place, this connection provides for adjusting the member 13 in the boss 14 to accommodate saw blades of different lengths. In the second place, it provides a construction by which the member 13 can be readily turned when it is desired to adjust the saw so that the blade will occupy a plane at an angle to the plane of the saw frame.

The connection between the saw-supporting member 5 and the frame arm 3 permits said member 5 to be turned into different angular positions and the screw-threaded connection between the saw-supporting member 13 and the frame arm 4 likewise permits said member to be turned into different angular positions.

In installing a saw blade in the frame, the saw-supporting member 13 will be adjusted in the boss 14 to a position corresponding to the length of the saw blade to be used and then one end of the saw blade will be attached to said member 13 and the other end attached to the saw-supporting member 5, it being understood that during the installation of the saw blade the handle 12 will be backed off so that the member 5 is loosely supported in the boss 6. After the saw blade has been connected to the supporting members 5 and 13 the handle 12 will be screwed up until the boss 6 is firmly clamped between the ferrule 11 and the projection 9 as shown in the drawing. The adjustment of the member 13 should be such that during this tightening operation the frame arms 3 and 4 will be drawn together somewhat and thus placed under a flexing strain, it being understood that the saw frame 1 is sufficiently resilient to permit the flexing of the arms. The resiliency of the arms 3 and 4 serves to keep the saw blade taut.

In installing the saw blade, the saw supporting members 5 and 13 may be positioned so that the saw blade will occupy the plane of the saw frame as shown in Fig. 1, or said members 5 and 13 may be turned about their axes so that the plane of the saw blade will be at right angles or at any other angle to the plane of the saw frame. While the turning of the saw-supporting member 13 in the boss 14 to change the angular position of the saw relative to the frame results in a slightly longitudinal movement of said member 13 due to its screw-threaded engagement with the boss 14, yet the resiliency of the arms 3 and 4 is sufficient to compensate for such movement while maintaining the saw blade sufficiently taut.

Another feature of the invention relates to the construction of the ferrule 11 and the manner of its connection with the handle 12, which usually is of wood. The ferrule 11 is formed with the screw-threaded opening 18 with which the screw-threaded portion of the member 5 has engagement. This ferrule is also formed with the cavity 19 in which the end of the handle 12 is received, said handle being provided with an axial recess 20 to receive the screw-threaded end 10 of the member 5.

The ferrule 11 is made with ribs 21 on the wall of the cavity 19, said ribs extending parallel to the axis of the handle. The said ferrule is also provided with one or more annular grooves 22 which are shown as having a depth approximately equal to the thickness of the ribs 21. The handle is made in the first instance with the handle receiving portion 23 thereof having a diameter substantially equal to the largest interior diameter of the cavity 19 so that when the ferrule is forced onto the handle the ribs 21 will plow their way through the exterior surface of the ferrule-receiving portion of the handle, thereby interlocking the ferrule and the handle to prevent any relative turning movement thereof.

I propose to apply glue to the handle before the ferrule is forced thereon and during the assembling of the ferrule and the handle the glue will fill the annular grooves 22. The glue will adhere to the wood and when the glue hardens or sets, it will form in effect annular ribs firmly secured to the handle and filling the annular grooves 22. These ribs of hardened glue serve to prevent the ferrule from being pulled off from the handle.

By this construction the ferrule will be firmly locked to the handle against either angular or axial movement relative thereto.

I claim:

A coping saw presenting a C-shaped frame having a boss at the end of each arm, a saw-supporting member having a screw-threaded shank extending through and having screw-threaded engagement with one boss, said saw-supporting member being of uniform diameter throughout its length and the screw-threaded shank portion being considerably longer than said boss, a finger extending laterally from said saw-supporting member, a lock nut screw-threaded to said shank, for locking the same from turning movement, a saw-supporting member also having a uniform diameter throughout its length and extending loosely through the other boss, said second saw-supporting member having a screw-threaded end, a finger extending laterally from said second saw-supporting member inside of the frame, a handle screw-threaded to the screw-threaded end of said second saw-supporting member and operating to clamp the finger against the boss thereby locking the saw-supporting member in position and a saw blade having its ends detachably secured to the saw-supporting members, the screw-threaded connection between the first-named saw-supporting member and the frame providing both for longitudinal adjustment of said member to accommodate saw blades of different lengths and an angular adjustment to provide for giving the saw different angular positions relative to the plane of the frame.

FREDERICK H. KELLEY.